United States Patent [19]

Allen et al.

[11] 4,191,168
[45] Mar. 4, 1980

[54] SOLAR ENERGY CONVERTING APPARATUS

[76] Inventors: Peyton S. Allen, R.R. 1, Grabill, Ind. 46741; Norman G. Bell, 628 Stratton Rd., Fort Wayne, Ind. 46825

[21] Appl. No.: 847,724

[22] Filed: Nov. 2, 1977

[51] Int. Cl.² .............................................. F24J 3/02
[52] U.S. Cl. .................................... 126/441; 165/163; 126/417
[58] Field of Search ................ 126/270, 271; 165/162, 165/163, 168, 172, 179; 138/38, 178, 125; 237/1 A

[56] References Cited

U.S. PATENT DOCUMENTS

| | | | |
|---|---|---|---|
| 1,747,826 | 2/1930 | Gould | 126/271 |
| 3,513,828 | 5/1970 | Masters | 126/271 |
| 3,720,235 | 3/1973 | Schrock | 138/178 X |
| 3,847,136 | 11/1974 | Salvail | 126/271 |
| 3,957,029 | 5/1976 | Nozik et al. | 126/270 |
| 4,014,314 | 3/1977 | Newton | 126/270 |
| 4,060,070 | 11/1977 | Harter | 126/271 |
| 4,060,071 | 11/1977 | Chayet | 165/170 X |
| 4,090,498 | 5/1978 | Benson | 126/271 |

FOREIGN PATENT DOCUMENTS 942345  2/1949  France ...................... 126/271

*Primary Examiner*—James C. Yeung
*Assistant Examiner*—Larry Jones
*Attorney, Agent, or Firm*—Gust, Irish, Jeffers & Hoffman

[57] ABSTRACT

A base plate having a predetermined perimetral configuration supports a planar coil of tubing surrounding a central space and overlying the plate. A core reflector having a reflective surface is fitted within the central space and is attached to the plate centrally thereof. A base of low thermal conductivity has the same configuration as the plate and underlies the plate in congruity therewith. A transparent enclosure defines a dead air space above the coil and has a flange with the same configuration as and overlies said plate. A frame having channel shaped sides slidably receives the edge portions of the contiguous plate, base and enclosure to maintain the edges superposed to provide for an insulated chamber for the coil. The tubing has interiorly thereof a pair of oppositely extending vanes which are spirally configured along the tube length to cause rotation of the fluid moving through the tube so that the fluid will be evenly heated.

15 Claims, 6 Drawing Figures

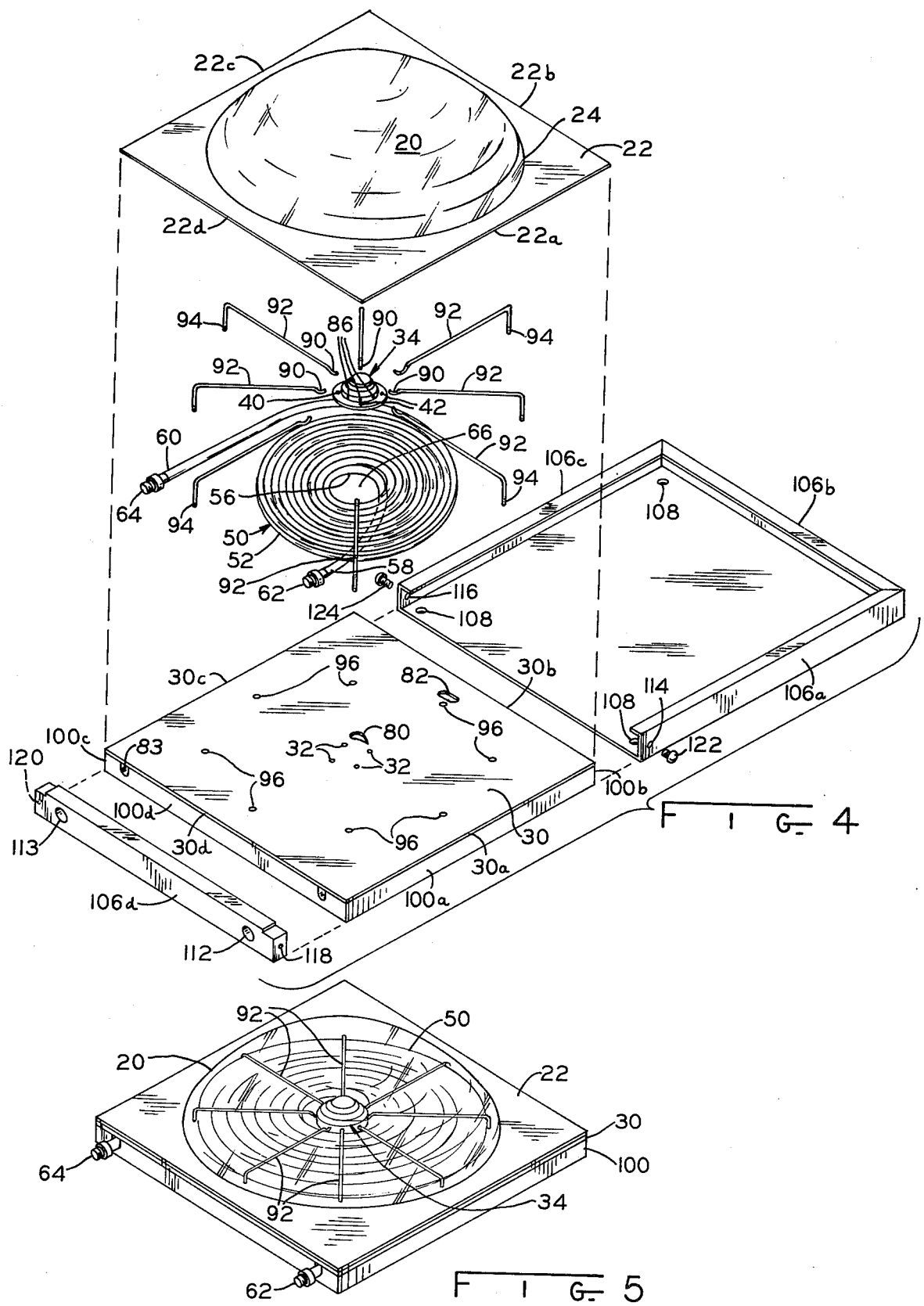

SOLAR ENERGY CONVERTING APPARATUS

BACKGROUND OF THE INVENTION

1. Field of the Invention

This invention is in the field of solar energy converting devices and more particularly to those devices utilizing a solar heated fluid carrying coil.

2. Description of the Prior Art

Numerous efforts over the years have been made to utilize the plentiful available solar energy for conversion to useable building heating and storage applications. This effeort has considerably intensified in recent years due to the national and world energy shortages. Devices for converting solar energy have included fluid carrying coils which were supported in housings and oriented to receive solar energy for heating the fluid within the coils for subsequent storage and use. These efforts are exemplified by U.S. Pat. Nos. 1,747,826; 2,552,237; 2,993,125; 3,254,644; 3,299,881; 3,513,828; 3,853,114 and 4,014,314.

However, while numerous devices are available, the manufacturing and maintenance costs, adaptability to modular applications, and inefficiencies have restricted widespread use thereof.

SUMMARY OF THE INVENTION

A solar energy conversion apparatus of this invention includes a rigid, supporting plate having a predetermined perimetral configuration, which in the preferred embodiment is substantially square. A dome-shaped reflector having a heat reflective surface is securely attached centrally of the plate. The reflector may have concentric fluted rings for capturing and reflecting solar energy rays. A flat, fluid carrying coil in tubing has a reflector receiving space at the center thereof and is attached in overlying relation to the plate. A thermally insulative base, which may be made of foamed plastic or fiberglass, has the same predetermined perimetral configuration as the plate and underlies the plate in perimetral congruity therewith so that the perimetral edges of the plate and base are in registry.

A heat energy transparent enclosure, such as a transparent dome of acrylic plastic, has a perimetral flange which overlies the plate such that its edges are also in registry with the perimeter of the plate. A metallic or plastic frame or tray having the same perimetral configuration has on three sides thereof channel shaped walls and an open side for slidably receiving the perimetral edges of the superposed dome flange, plate, and the base. Once the assembly is fully inserted into the channeled walls, a fourth channeled side is then attached to the channeled walls defining the open side thus providing an easily assembled, thermally insulated, encapsulated solar heated fluid carrying coil. Other means may be employed to hold the perimetral edges in assembly.

The two end sections of the coil lie in suitable channels in the base and emerge from the fourth side of the frame. Each of the tube ends is preferably equipped with a quick-release fitting so that several units may be easily placed in series or in parallel as may be desired.

As mentioned, the reflector is attached to the plate, as by threaded fasteners, and, further, is provided with a plurality of arcuately spaced openings for receiving first ends of retaining arms which extend radially outwardly from the reflector. The arms overlie the coil, holding the coil onto the upper surface of the plate, and each of the arms are attachable at their distal ends to the plate, as by means of threaded fasteners.

The coil is preferably made from reinforced rubber tubing, or from plastic or copper, having inwardly disposed vanes spirally configured along the tube length. The fluid, which may be water, ethylene glycol, or other anti-freeze liquid, is thus caused to flow in a helical path through the tube to insure uniform heating since just one side of the coil is subjected to the solar energy. Also, the assembled conversion unit of this invention may be placed at an angle and oriented to receive maximum exposure to the solar radiation through the energy transparent dome. The energy directly impinges upon the coil which is coated for maximum absorption of solar radiation. In previous coil assemblies, that radiation which impinged at the central space of the coils was largely absorbed by the base and thus unavailable for coil heating purposes. With the reflector of this invention, the solar energy impinging on the coil center is cause to be reflected omni-directionally with the reflections impinging directly upon the coil or on the interior surface of the dome for secondary reflection back to the coil. The interior surface of the dome may be advantageously coated with a reflective material, such as a Teflon glaze.

It is an object of this invention to provide a solar energy conversion apparatus which is inexpensive to manufacture, easy to assemble, and has a relatively high conversion efficiency.

Another object of this invention is to provide in such an apparatus adaptability for modular connection.

A still further object of this invention is to provide in a device of the previous objects a solar radiation heating coil having spirally configured vanes formed interiorly of the tube to cause the heating fluid in the tubes to take a helical path through the tube thus insuring even heating of the fluid.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 4 is a partially assembled exploded view in perspective of the embodiment shown in FIGS. 1 to 3;

FIG. 5 is a view in perspective of the subassembly prior to insertion in the retaining frame.

DESCRIPTION OF THE PREFERRED EMBODIMENT

Figure 1:
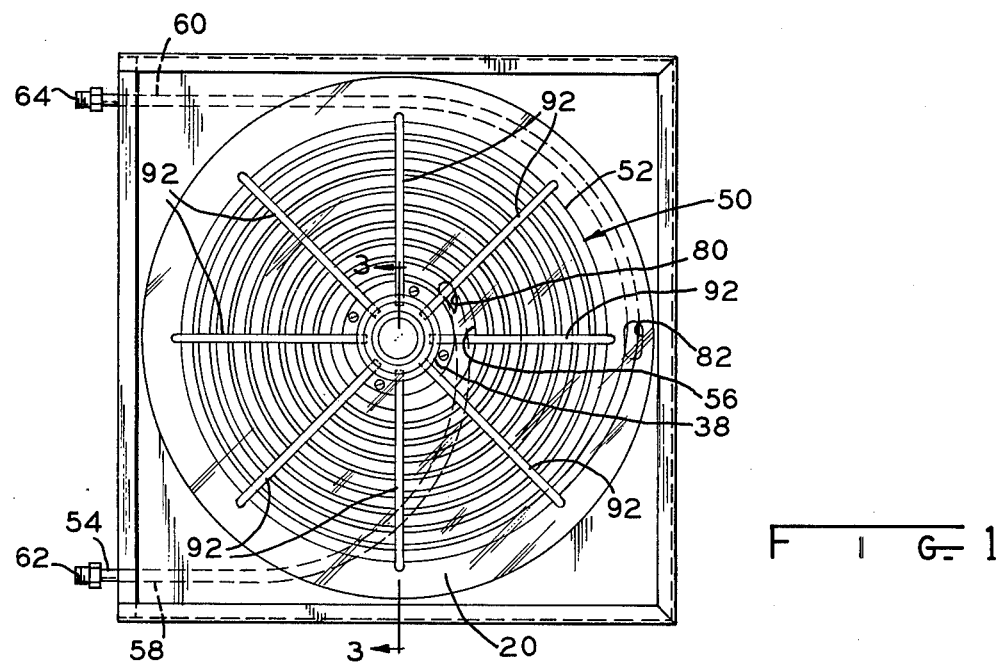
FIG. 1 is a top plan view of a preferred embodiment of this invention.
Figure 2:
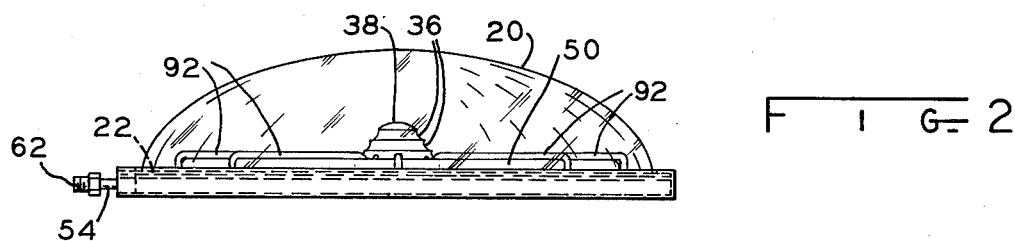
FIG. 2 is a side elevational view of the embodiment of FIG. 1.
Figure 3:
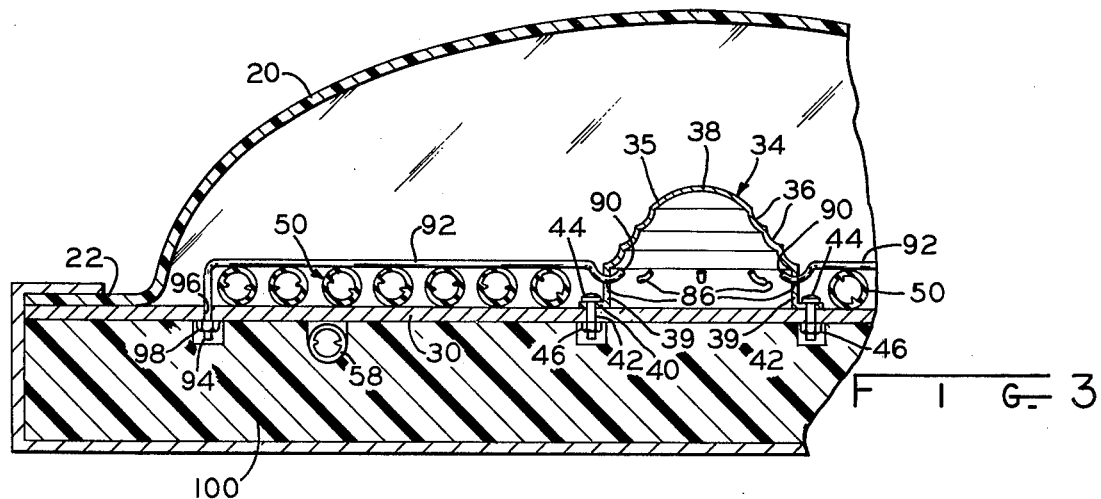
FIG. 3 is an enlarged partial section taken at line 3-3 of FIG. 1.

Referring to the drawings, and in particular FIG. 4, a transparent dome 20, preferably shaped convexly, is provided with a flat flange 22 extending from its perimeter 24. Flange 22 is preferably square, with edges 22a, 22b, 22c and 22d. The inner surface of dome 20 may have a transparent-reflective coating 26 such as a Teflon glaze which has the property of infrared transparency from outside the dome and reflectivity from inside the dome. Dome 20 may be circular or oval shaped, is preferably of a thin material to minimize heat absorption, and of a height that will be self-cleaning of snow, leaves and other matter that might deposit thereon. Flange 22 overlies and is contiguous with a supporting metal plate 30 of the same outline as flange 22, having edges 30a, 30b, 30c and 30d, the upper surface being coated with a flat black paint or some other suitable heat-absorbent material. Plate 30 has four centrally located equally spaced holes 32. A three-dimensional reflector 34, FIGS. 1 to 3, has an exterior surface 35 which is reflective to infrared radiation. Reflector 34 is generally dome-shaped and preferably has a plurality of concentric grooves 36 formed therein with the grooves being vertically spaced and of gradually decreasing diameter, terminating in a dome top 38. A cylindrical wall 39 is formed between the lowermost groove 36 and an annular flange 40, with flange 40 having four equally spaced openings 42 in registry with openings 32 in plate 30. Screws 44 are inserted through openings 42 and 32 and nuts 46 are engaged with screws 44 to affix dome 34 to plate 30.

A flat coil 50, shown circular in configuration but may take other shapes such as oval to suit a particular purpose, is composed of spirally wound tubing 52 with the coils preferably contiguous, and may be of a reinforced rubber material, plastic or copper tubing having an end section 58 extending from the innermost turn 56, which terminates in end portion 54. A second end portion 60 leads from the outermost turn of coil 50. Quick disconnect fittings 62, 64 are attached to ends 54, 60, respectively, for connection to other coils in other conversion devices, not shown, in modular fashion. Innermost turn 56 defines a circular space 66 at the coil center.

Figure 6:
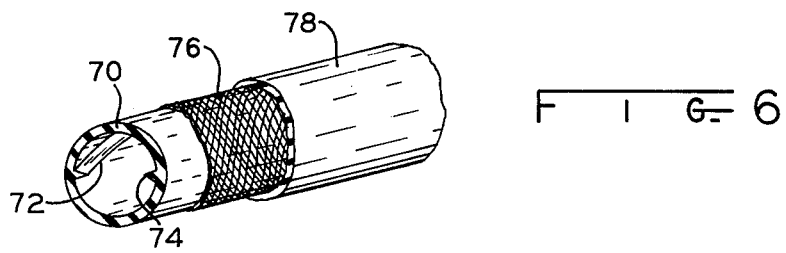
FIG. 6 is an enlarged, broken away, partial view in perspective of a section of coil tube showing the spiral vanes.

Tube 70, FIG. 6, may have an inner lining 70 of rubber provided with vanes 72, 74 interiorly thereof and projecting inwardly from the inner surface. Vanes 72, 74 are spirally or helically formed in tube 70 so that fluid flowing through tube 70 will be caused to rotate about the tube axis to achieve more uniform circulation as will be later described. Tube 70 may have a fibrous reinforcing braid 76 exteriorly formed therearound with an outer rubber sheath 78 covering braid 76. The materials for tube 70 are selected to resist heat, sunlight, ozone, and anti-freeze liquid such as ethylene glycol which may be used as the heat conversion liquid in the tube. Also, the tube should be able to withstand pressures of approximately 125 pounds per square inch and should be dimensionally stable but yet accommodate some expansion and contraction during temperature changes. Also, sheath 78 should be a heat absorbent color such as flat blcak for maximum heat absorption of solar rays. Copper tubing may be utilized in place of the reinforced rubber tubing shown in FIG. 6, with the vanes 72, 74 formed during extrusion of the tubing. The tubing would likewise be provided with a heat absorbent exterior.

Plate 30 has a teardrop shaped opening 80, FIG. 4, for receiving end portion 54 and tubing length 58 of coil 50. Due to the teardrop shape, opening 80 closely conforms to the shape of the coil tubing 52 situate in the opening 80 so that tube portion 58 can underlie plate 30 and extend beyond edge 30d of plate 30. Beneath plate 30, the tubing length 58 is received by a channel 81 in base 100. An opening 82 is provided in plate 30 adjacent edge 30b for receiving end portion 60 of coil 50 which also extends under plate 30, through a channel 83 in base 100.

Reflector 34 has a plurality of equally circumferentially spaced holes 86 in wall 39. Holes 86 receive end hooks 90 of retaining rod elements or arms 92, respectively, the other ends 94 thereof being threaded and down-turned as shown for insertion through respective holes 96 in plate 30. Nuts 98 are threaded onto ends 94 and tightened against plate 30, clamping coil 50 snugly against plate 30. Thus, after reflector 34 and coil 50 have been mounted on plate 30, arms 92 are hooked at ends 90 into openings 86, lowered onto coil 50 and oriented radially from reflector 34 so that ends 94 can be inserted through holes 96. In this manner, coil 50 is securely mounted on plate 30.

A flat base 100 of low thermal conductivity, formed of a material such as foamed polystyrene or glass reinforced plastic, is provided with clearances for receiving nuts 46 and 98. It has the same outline as plate 30 and flange 22, the edges being identified by numerals 100a, 100b, 100c and 100d. Dome 20 and plate 30 are superposed therein to provide the subassembly shown in FIG. 5.

A three sided tray or frame 106, FIG. 4, which may be of a noncorrosive metal or plastic, has three channel-shaped sides 106a, 106b and 106c and openings 108 in the floor for drainage of condensation. The assembly of FIG. 5 is slidably snugly received within sides 106a, 106b and 106c with the inwardly formed edges thereof clamping the edge portions of flange 22, plate 30 and base 100 together. Once fully inserted, an elongated channel-shaped strip 106d is fitted over the remaining edge of the assembly to clamp the edge portions together and to close the open edge of the tray. Holes 114, 116 are formed in sides 106a, 106c and register with holes 118, 120 in opposite ends of strip 106d, respectively, for receiving threaded fasteners 122, 124 thereby to removably attach strip 106d to tray 106 to complete assembly of the conversion module. Fittings 62 and 64 may then be placed on ends 54, 60, respectively, which are received by holes 112 and 113 in strip 106d, for connection into a fluid-circulating system (not shown) or to other modules in series or parallel as desired.

In operation, the liquid to be used to absorb the solar energy is introduced into one of the coil ends 54 or 60 to fill the coil 50. The liquid may be circulated continuously or intermittently as may be desired. The module is optimumly positioned to receive direct radiation from the sun which penetrates dome 20 and impinges on the coil 50. The radiation impinging reflector 34 is reflected somewhat randomly onto coil 50 and back toward dome 20. Some of this reflected radiation is further reflected back onto the coil 50, about the dead-air space within the dome and some out of the dome itself. However, by reason of this random reflection, the dome itself experiences some elevation in temperature as well as the air in the dead-air space. Thus, the cooling affect of external air currents is neutralized to some extent thereby reducing loss of heat from the liquid in the coil 50.

Direct radiation impinging the exposed, flat black surface of plate 30 heats the plate 30. Plate 30 conducts this heat energy to the space under dome 20 and also to the coil 50. Those corner portions of the plate 30 beyond dome 20 are thus utilized in capturing the solar energy, further enhancing conversion efficiency of the module. Since the base 100 is a thermal insulator, heat loss from plate 30 is minimized. The coil 50 is thereby subjected to heating from both sides, on the top from direct and reflected radiation as well as the heated air in the dome space and from the bottom by the plate 30.

In the following are given dimensions of an operative embodiment of this invention, these being given as exemplary only and not to be considered as limitative of this invention.

| | |
|---|---|
| Length of tubing in coil 50 with turns contiguous | 90 feet |
| Length of each module edge | 42 inches |
| Outer diameter of coil 50 | 34 inches |
| Outer diameter of reflector 34 | 6 inches |
| Outer diameter of dome 20 | 36 inches |
| Height of dome 20 | 9 inches |
| Number of arms 92 | 8 |
| Thickness of metal plate 30 | 20 gauge |
| Thickness of base 20 formed of rigid polystyrene foam | 1½ inches |
| Thickness of dome 20 formed of acrylic plastic | 3/16 inch |

The module of this invention is economical to manufacture by reason of the simplicity in design of the individual parts and the manner of assembly. A minimum of fasteners are required and only inexpensive materials are used. The design is efficient in converting solar energy into heat and further is shaped to be self-cleaning of the usual atmospheric substances, such as snow, rain, leaves and the like. For one test model, connected into a closed system having a pump and reservoir, outside temperature at 60° F. and initial water temperature at 65° F., after one and three-quarters hours of direct exposure to the sun and with no circulation, water temperature at the outlet of the coil 50 was measured to be 155° F. This test model used a coil 50 formed of ninety feet of reinforced rubber tubing with the turns of the coil being contiguous.

While there have been described above the principles of this invention in connection with specific apparatus, it is to be clearly understood that this description is made only by way of example and not as a limitation to the scope of the invention.

What is claimed is:

1. Solar energy conversion apparatus comprising a flat plate of thermally conductive material, a planar heat-absorbing device in the form of a flat spirally wound coil of tubing superposed on said plate, said coil having an open space centrally thereof which receives a radiation-reflective member, a cover element transmissive of solar radiation disposed in spaced relation over said device and peripherally mounted on said plate thereby defining a dead-air space therewith, a flat base of material of low thermal conductivity, said plate being superposed on said flat base, means for securing said plate, said base, said cover element and said heat-absorbing device together, said cover elements including a material that is also reflective of some of the solar radiation whereby radiation reflected from objects within said dead-air space onto said cover element is further reflected internally thereby contributing heat energy to the air within said space, to said cover element, to said heat absorbent element and to said plate, said coil having opposite ends to which fluid-conducting connections may be made, said tubing interiorly having at least one inwardly projecting helically extending vane which imparts rotation to fluid circulated through said tubing.

2. Solar energy conversion apparatus comprising a flat plate of thermally conductive material, a planar fluid carrying heat absorbent device formed of a length of tubing superposed on said plate, a cover element transmissive of solar radiation disposed in spaced relation over said heat absorbent device and peripherally mounted on said plate thereby defining a dead-air space therewith, a flat base of material of low thermal conductivity, said plate being superposed on said flat base, means for securing said plate and said elements together, and said length of tubing having two end portions which project beyond the perimeter of the assembled plate and base to which fluid conducting connections may be made, said cover element including a material that is also reflective of some of the solar radiation whereby radiation reflected from objects within said dead-air space onto said cover element is further reflected internally thereby contributing heat energy to the air within said space, to said cover element, to said heat absorbent element and to said plate, said heat absorbent element being in the form of a tubing having planar arranged convolutions provided with an open space centrally thereof, and a member disposed in said open space and secured to said plate, said member having a radiation-reflective surface whereby radiation impinging thereon is reflected in directions toward and away from said coil.

3. The apparatus of claim 2 wherein the convolutions of tubing are in the form of a spirally wound coil.

4. The apparatus of claim 3 wherein said cover element has a convexly shaped dome portion.

5. The apparatus of claim 3 including hold-down means for securing said coil onto said plate, said hold-down means including a plurality of rod elements radially disposed on said coil in engagement therewith, said rod elements being circumferentially spaced with respect to said coil and having opposite ends, respectively, operatively secured to said plate thereby securing said coil onto said plate.

6. The apparatus of claim 5 wherein the inner ends of the rod elements are removably connected to said member and the outer ends are bent transversely to extend through companion openings in said plate, and threaded fasteners on the ends that project through said plate for drawing said rod elements downwardly against said coil.

7. The apparatus of claim 5 including means for removably fastening the inner ends of said rod elements to said plate.

8. The apparatus of claim 7 wherein said fastening means includes an upstanding member on said plate having a plurality of apertures therein, said inner ends of said rods being received by said apertures thereby to hold said rods into engagement with said coil.

9. The apparatus of claim 6 wherein said inner ends are hook-shaped and engaged with companion openings in said member which is three-dimensional, said base being formed of a ridid foam plastic and having recesses which receive with clearance said threaded fasteners, respectively, said base further having channel shaped recesses for receiving opposite end lengths of said coil tubing that entend beneath said plate.

10. The apparatus of claim 2 wherein said cover element is a convexly shaped dome having a flat peripheral flange superposed on said plate, the upper surface of said plate being blackened thereby to maximize the absorption of solar energy, said plate conducting heat energy absorbed thereby to said dead-air space and to the underside of said heat absorbent element.

11. The apparatus of claim 2 wherein the edges of said cover element, said plate and said base coincide, and said means includes a frame having channel portions which receive in clamping relation the marginal edge portions of said cover element, said plate and said base thereby to provide an integrated assembly.

12. The apparatus of claim 11 wherein said cover element, said plate and said base are orthogonally shaped, said frame having three elongated channel portions integrally connected together to define two right angle corners whereby the assembly of said cover element, said plate and said base may be slidably inserted thereinto, the fourth channel portion being elongated and having opposite ends which are removably secured to the free ends of said three channels thereby closing said frame, said end portions of said tubing extending through companion openings in said fourth channel.

13. The apparatus of claim 12 wherein said frame is in the form of a tray having a bottom and said three channels as upstanding sides thereon, said tray slidably receiving said assembly in snug relation with said bottom supporting said base.

14. The apparatus of claim 12 wherein said member is dome-shaped and provided with one or more concentric flutes, a flat flange extending radially from said member and superposed on said plate, fastening means securing said flange to said plate, said base being of a rigid foam plastic and provided with two channels that open through the edge thereof contiguous with said fourth channel, the companion openings in said fourth channel being in registry with said channel openings, respectively, the end portions of said tubing that form said coil passing through respective oenings in said plate and extending therebeneath through said channels and out of said fourth channel openings.

15. The apparatus of claim 14 wherein said tubing is of black rubber, plastic or metal, said convolutions forming a spirally wound coil the turns of which being contiguous, said tubing interiorly having at least one inwardly projecting helically extending vane which imparts rotation to fluid circulated through said tubing.

* * * * *